F. J. RABBETH.
FISH LURE.
APPLICATION FILED NOV. 3, 1915. RENEWED JUNE 1, 1918.
1,315,408. Patented Sept. 9, 1919.
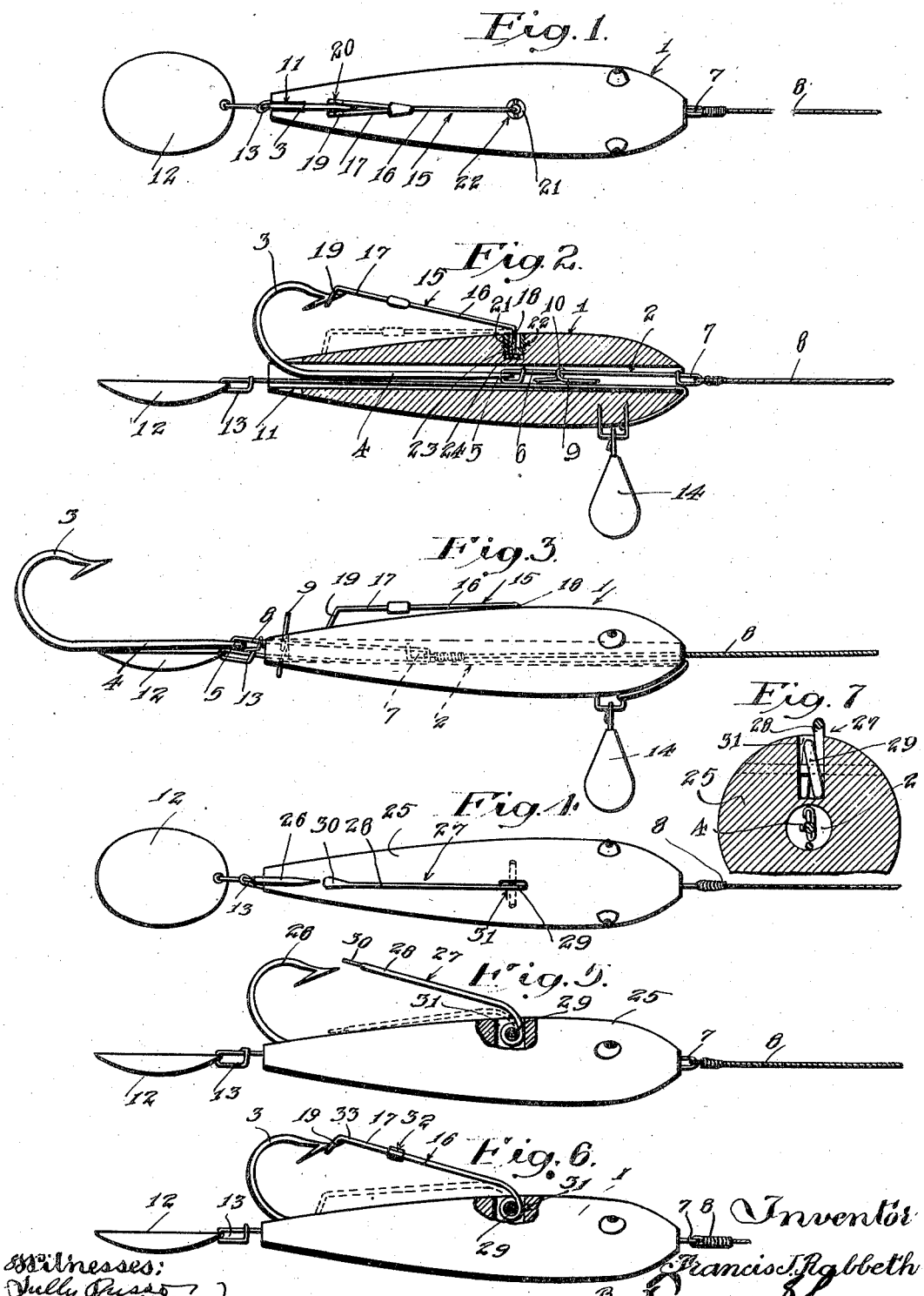

UNITED STATES PATENT OFFICE.

FRANCIS J. RABBETH, OF REDLANDS, CALIFORNIA.

FISH-LURE.

1,315,408.  Specification of Letters Patent.  Patented Sept. 9, 1919.

Application filed November 3, 1915, Serial No. 59,371. Renewed June 1, 1918. Serial No. 237,822.

*To all whom it may concern:*

Be it known that I, FRANCIS J. RABBETH, a citizen of the United States, residing at Redlands, in the county of San Bernardino and State of California, have invented a new and useful Fish-Lure, of which the following is a specification.

This invention relates to fish lures or artificial bait.

Much difficulty is experienced in trolling with artificial bait or lures as the hook often catches upon or picks up seaweed or the like and the lure does not attract fish under these conditions. The main object of my invention, therefore, is to provide a guard which will prevent seaweed and the like from catching upon the hook, said guard being constructed and arranged so that it will not interfere with the hooking of the fish when the latter "strikes" the bait but will be moved out of guarding position by the fish at the time that the bait is "struck".

Another object is to provide a lure the body of which when the fish is hooked will slide up along the line away from the hook and will not interfere with the fish.

A further object is to provide means for preventing the body of the lure from sliding back upon the hook after the fish is hooked.

This invention further contemplates generally improving fish lures so as to render them more effective by giving them a natural appearance and movement in the water.

Other objects and advantages will appear from the subjoined detail description.

The accompanying drawings illustrate the invention.

Figure 1 is a top plan view of the lure;

Fig. 2 is a longitudinal sectional view;

Fig. 3 is a side elevation showing the position of the lure when the fish is hooked;

Fig. 4 is a top plan view of the modified form of lure;

Fig. 5 is a side elevation of the modified form showing the position of the lure when the fish is hooked;

Fig. 6 is a detail of the modified form of guard; and

Fig. 7 is an enlarged cross section showing the guard connection in detail.

Referring to the drawings by characters of reference, 1 designates the body of the lure which, as shown in the drawings, may be constructed in the form of a minnow and is formed with a longitudinal bore 2 extending therethrough from end to end.

A hook 3 is carried by the body 1, the shank 4 of the hook being inserted in the bore 2 at the tail end of the body. An eye 5 is formed on the end of the shank and attached to the eye is a metal wire leader 6 which extends through the bore 2 and is formed with an eye 7 at its free end for connection with the line 8.

Slidably mounted upon the leader 6 is a stop member 9 which extends on either side of the leader and normally rests within the bore 2. This stop is preferably formed from a straight piece of wire having a central loop 10 which loosely receives the leader 6.

The body 1 is formed with a slot 11 at the tail end on the upper side of the body and this slot communicates with the bore 2. The bill portion of the hook at the point where it curves from the shank engages within the slot 11 and the hook is thus held in upright position on the upper side of the body 1.

A spoon or spinner 12 is non rotatably but loosely connected to a snap fastener 13 carried at the rear end of the body beneath the hook. This spoon or spinner is adapted to oscillate when the lure is drawn through the water and may be removed from the snap fastener when desired.

Detachably secured to the forward end of the body and depending therefrom is a weight 14 which may be removed when desired so that a heavier or lighter weight, depending upon the character of the fishing, may be attached.

A guard 15 is connected with the body on the upper side thereof and comprises a straight wire 16 having a bifurcated clasp 17 at one end and a pivotal connection 18 with the body 1 at its other end. The clasp 17 is preferably formed with down-turned ends 19 between which the point of the hook is frictionally held so that the main portion of the clasp lies outward beyond and protects the point of the hook. If desired the arms of the clasp 17 may be formed with opposed notches 20 in the inner faces thereof so that the hook point may engage therein and the guard will be prevented from coming off of the hook accidentally.

The pivot for the guard comprises a central apertured plug 21 which is countersunk in a threaded opening 22 in the body 1 and receives the angularly bent terminal 23 of the guard, a head 24 being formed on the end of said terminal and having a diameter larger than the opening in the plug. It will thus be seen that the guard is free to rotate upon the body. The opening in the plug is considerably larger than the guard so as to allow the guard to assume position substantially close to the body 1.

In operation the lure is arranged as shown in Fig. 1 of the drawings and when struck by a fish the guard 15 will be also engaged by the mouth or some other part of the fish and caused to disengage from the point of the hook, thus allowing the hook to catch upon the fish and the body of the lure to slide upwardly on the line. When the body slides upwardly on the line the wire leader 6 and stop member 9 are drawn out of the body and the stop member will rest upon the leader at the point where it is connected with the eye of the hook and will prevent the body from sliding back upon the shank of the hook. When seaweed or other foreign matter encounters the guard 15 it will be deflected from the point of the hook and since the guard or the entire lure will give relative to the object that it encounters little or no pressure is exerted upon the guard as compared to that which is exerted when the fish strikes the lure and simultaneously the guard. It will be seen that under normal conditions the guard holds sufficiently tight upon the hook to prevent any foreign matter from catching upon and interfering with the operation of the hook. The spinner or spoon 12 oscillates when the lure is drawn through the water and the weight 14 moves accordingly, thus causing the lure to move from side to side in a zig-zag path. This movement closely resembles that of a live minnow and attracts the fish to the lure.

With reference to Figs. 4 and 5 wherein I have illustrated a modified form of lure, 25 designates the body of the lure, it being identical with the body in the preferred form of the invention, and 26 the hook. This hook is mounted upon the bait in a manner identical with the hook in the preferred form and the other parts of the lure irrespective of the guard may be the same as those used in connection with the preferred form of the invention.

A guard 27 comprising a straight piece of wire 28 is formed with a vertical loop 29 at one end and an enlargement 30 at its other end. The loop 29 has its free end offset and the wire from which the guard is formed is preferably resilient.

A recess 31 is provided in the upper side of the body and receives the loop 29. A pivot pin is inserted transversely through the body. The offset end of the loop 29 frictionally engages one of the walls of the recess 31 and provides means for frictionally holding the guard in guarding or out-of-the-way position.

To set the guard the enlarged end 30 is disposed in spaced outward relation to the point of the hook and the end of the loop 29 frictionally engaging the wall of the recess 31 holds the guard in position. Any seaweed or foreign matter encountering the guard will not under ordinary conditions move it out of position since the lure is permitted to yield relative to the object encountered and little or no pressure is exerted upon the guard but when the lure is struck by a fish the guard is encountered and readily moved out of guarding position into a position substantially flat upon the top of the body of the lure and will remain in such position owing to the frictional engagement of the end of the loop relative to the wall 31 of the recess. The operation of this form of lure otherwise is identical with the operation of the lure in the preferred form of the invention.

Referring to Fig. 6 of the drawings wherein I have illustrated another modified form of guard, 32 designates a guard which is identical in every respect to the guard in the modified form of the invention excepting that the free end of the guard instead of being flattened or enlarged is provided with a bifurcated clasp 33 identical with the clasp in the preferred form of the invention. In this form the guard is held very rigidly in position since it is frictionally held at both ends and this type of guard may prove of value in fishing in waters containing large quantities of seaweed and other growth.

It is understood that the invention is not limited to the exact construction shown in the drawings and described above, but that deviations therefrom may be made within the spirit and scope of the invention.

I claim:

1. A fish lure comprising a body, a hook slidably carried by the body, a guard pivotally and rotatably connected with the body, and means to releasingly hold the guard upon the point of the hook.

2. A fish lure comprising a body, a hook slidably carried upon the body, a guard pivotally and rotatably connected with the body, and a bifurcated clasp carried by the guard and receiving the point of the hook to frictionally hold the guard in position.

3. A fish lure comprising a body having a longitudinal bore extending therethrough from end to end, a hook having its shank extending within the bore, a leader connected with said shank and extending through the bore, a line connected with the leader, and a stop member slidably and loosely mounted upon said leader having a length greater than the diameter of the bore whereby when the hook is pulled out of the bore the body will engage the stop and be spaced from the shank of the hook.

4. A fish lure comprising a body, a hook carried upon the body, a guard pivoted to the body, said body having a recess therein in which the guard is pivoted, and resilient means carried by the guard frictionally engaging in the recess to hold the guard in guarding position relative to the point of the hook.

5. A fish lure comprising a body, a hook secured to the body at the rear end thereof and a spoon non rotatably secured to the body at the end to which is secured the hook, said spoon being adapted for oscillation laterally and rearwardly of the hook and being located in close relation to said hook.

6. A fish lure comprising a body, a hook carried by the body, a guard pivotally and rotatably connected with the body, and means to releasingly hold the guard upon the point of the hook.

In testimony whereof, I have hereunto set my hand at Redlands, California, this 19th day of October, 1915.

FRANCIS J. RABBETH.

In presence of—
 ANNIE L. RABBETH,
 W. E. RABBETH.